United States Patent
Cazasnoves et al.

(10) Patent No.: US 11,380,127 B2
(45) Date of Patent: Jul. 5, 2022

(54) METHOD OF SEGMENTING AN INPUT IMAGE REPRESENTING AT LEAST ONE BIOMETRIC TRAIT BY MEANS OF A CONVOLUTIONAL NEURAL NETWORK

(71) Applicant: Idemia Identity & Security France, Courbevoie (FR)

(72) Inventors: Anthony Cazasnoves, Courbevoie (FR); Emilie Niaf, Courbevoie (FR); Laurent Kazdaghli, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 25 days.

(21) Appl. No.: 17/077,265

(22) Filed: Oct. 22, 2020

(65) Prior Publication Data
US 2021/0124899 A1 Apr. 29, 2021

(30) Foreign Application Priority Data
Oct. 24, 2019 (FR) .................................. FR1911912

(51) Int. Cl.
*G06V 40/12* (2022.01)
*G06T 7/10* (2017.01)
(Continued)

(52) U.S. Cl.
CPC .......... *G06V 40/1359* (2022.01); *G06T 7/10* (2017.01); *G06V 10/449* (2022.01);
(Continued)

(58) Field of Classification Search
CPC .......... G06T 7/10; G06T 2207/20081; G06T 2207/20084; G06V 30/194; G06V 10/449; G06V 40/12–1394
See application file for complete search history.

(56) References Cited

U.S. PATENT DOCUMENTS

| | | | | |
|---|---|---|---|---|
| 5,974,163 A | * | 10/1999 | Kamei | A61B 5/1172 382/125 |
| 6,067,369 A | * | 5/2000 | Kamei | G06V 10/48 382/125 |

(Continued)

FOREIGN PATENT DOCUMENTS

EP 551086 A2 * 7/1993 ......... G06K 9/00067

OTHER PUBLICATIONS

Tang Yao et al.: "FingerNet: An unified deep network for fingerprint minutiae extraction", 2017 IEEE International Joint Conference on Biometrics (IJCB), IEEE, Oct. 1, 2017, (Oct. 1, 2017), pp. 108-116, XP033308604, DOI:10.1109/BTAS.2017.8272688 [extrait le Jan. 29, 2018]*abrege: Figures 1,2, 3 ** Sections 2.1.4, 2.1.5, 2.2.2, 2.2.4, 2.2.5, 2.3.4, 3.3*.
(Continued)

*Primary Examiner* — Sean T Motsinger
(74) *Attorney, Agent, or Firm* — Womble Bond Dickinson (US) LLP

(57) ABSTRACT

The present invention relates to a method of segmenting an input image representing at least one biometric trait, by means of a convolutional neural network, CNN, the method being characterized in that it comprises the implementation, by data processing means (21) of a client (2), of steps of (b) generating, by means of a first subnetwork of said CNN, referred to as a specialization block, a confidence mask associated with a ridge orientation map of the at least one biometric trait represented by said input image, referred to as a RFM mask; said RFM mask being applied to at least the input image so as to obtain a focused input image; (c) segmenting, by means of a second subnetwork of said CNN, referred to as a segmentation block, the focused input image.

13 Claims, 5 Drawing Sheets

(51) Int. Cl.
*G06V 10/44* (2022.01)
*G06V 30/194* (2022.01)

(52) U.S. Cl.
CPC .. *G06V 30/194* (2022.01); *G06T 2207/20081* (2013.01); *G06T 2207/20084* (2013.01)

(56) References Cited

U.S. PATENT DOCUMENTS

| | | | | |
|---|---|---|---|---|
| 2014/0205162 | A1* | 7/2014 | Hara | G06V 40/1359 |
| | | | | 382/125 |
| 2020/0050821 | A1* | 2/2020 | Kazdaghli | G06V 10/26 |
| 2020/0082147 | A1* | 3/2020 | Thuillier | G06V 40/1376 |
| 2021/0124899 | A1* | 4/2021 | Cazasnoves | G06V 30/194 |
| 2021/0209333 | A1* | 7/2021 | Sakumoto | G06F 21/32 |

OTHER PUBLICATIONS

Jian Li et al.: "Deep convolutional neural network for latent fingerprint enhancement", Signal Processing. Image Communication., vol. 60, Feb. 1, 2018 (Feb. 1, 2018), pp. 52-63, XP055590662, NL; ISSN: 0923-5965, DOI: 10.1016/j.image.2017.08.010 The entire document.

Hong L et al.: "Fingerprint Image Enhancement: Algorithm and Performance Evaluation", IEEE Transactions on Pattern Analysis and Machine Intelligence, IEEE Computer Society, USA, vol. 20, No. 8, Aug. 1, 1998, (Aug. 1, 1998), pp. 777-789, XP000774452, ISSN: 0162-8828, DOI: 10.1109/34.709565 The entire document.

\* cited by examiner

[Fig 1]
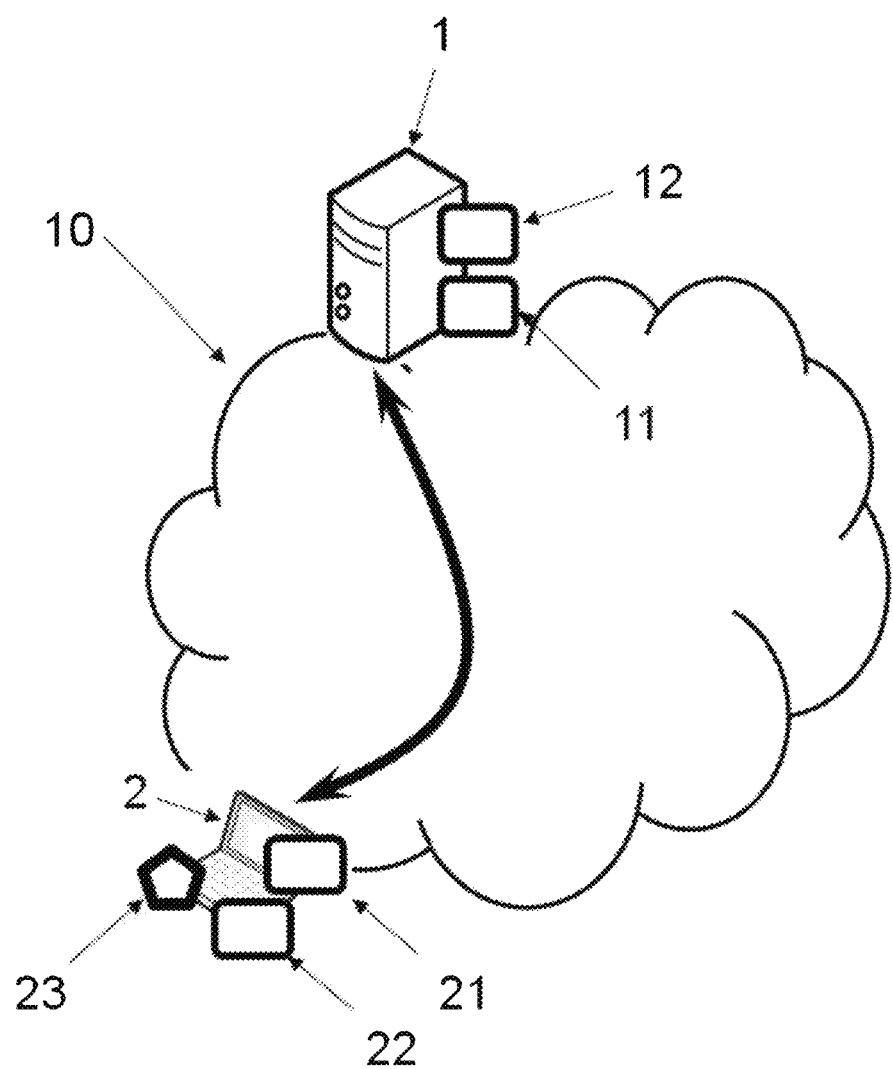

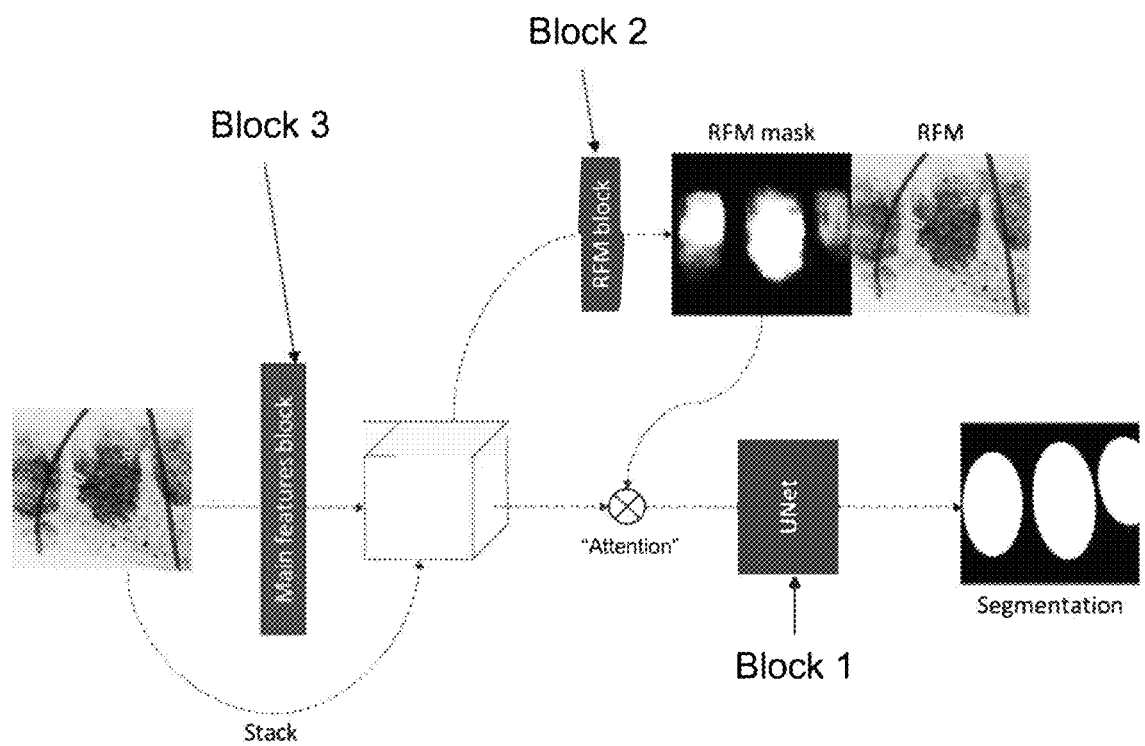
[Fig 2a]

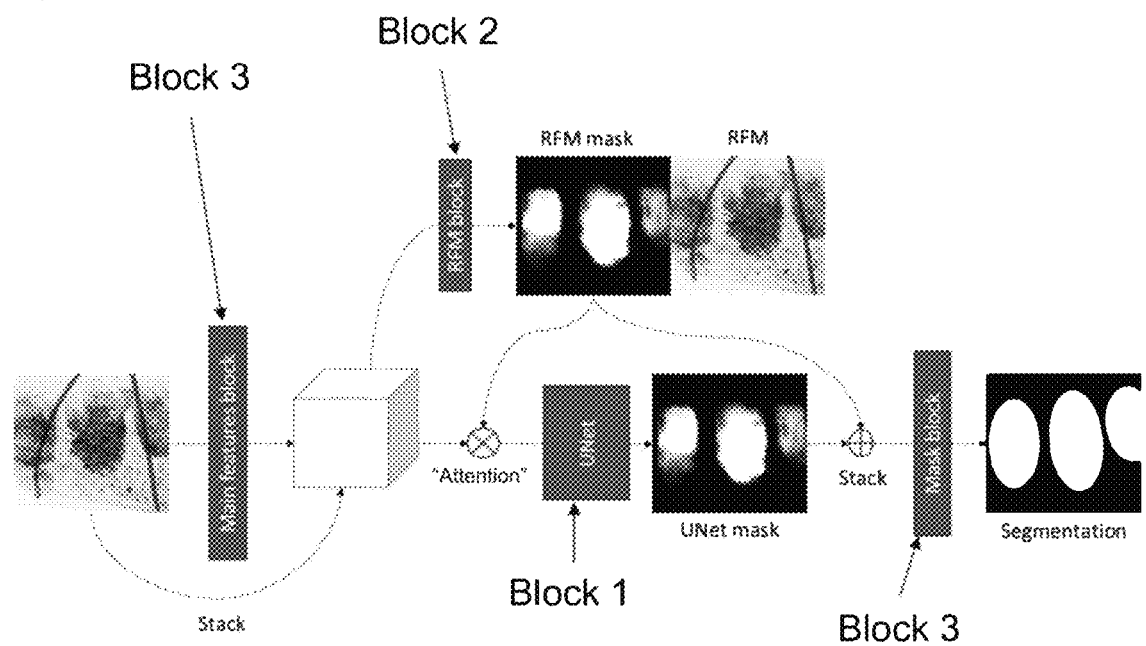

[Fig 3]
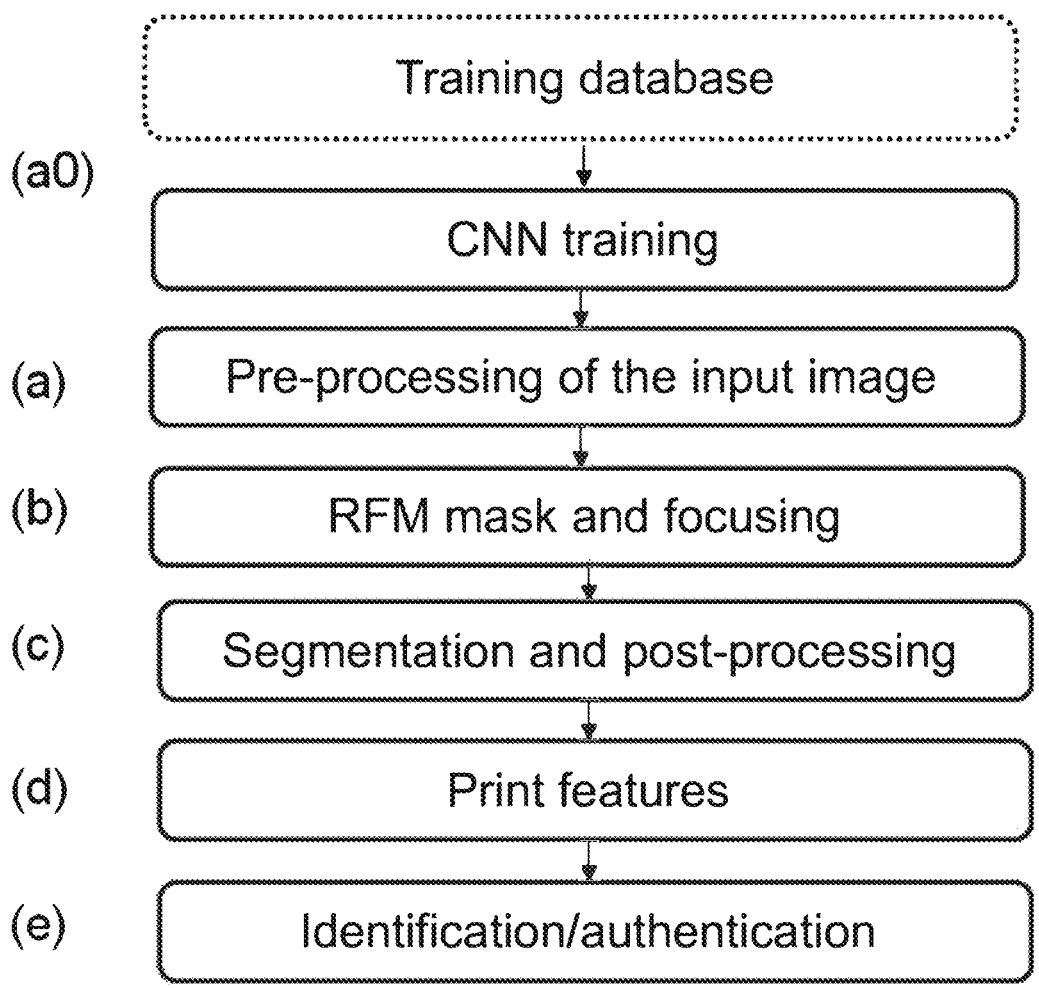

[Fig 4]
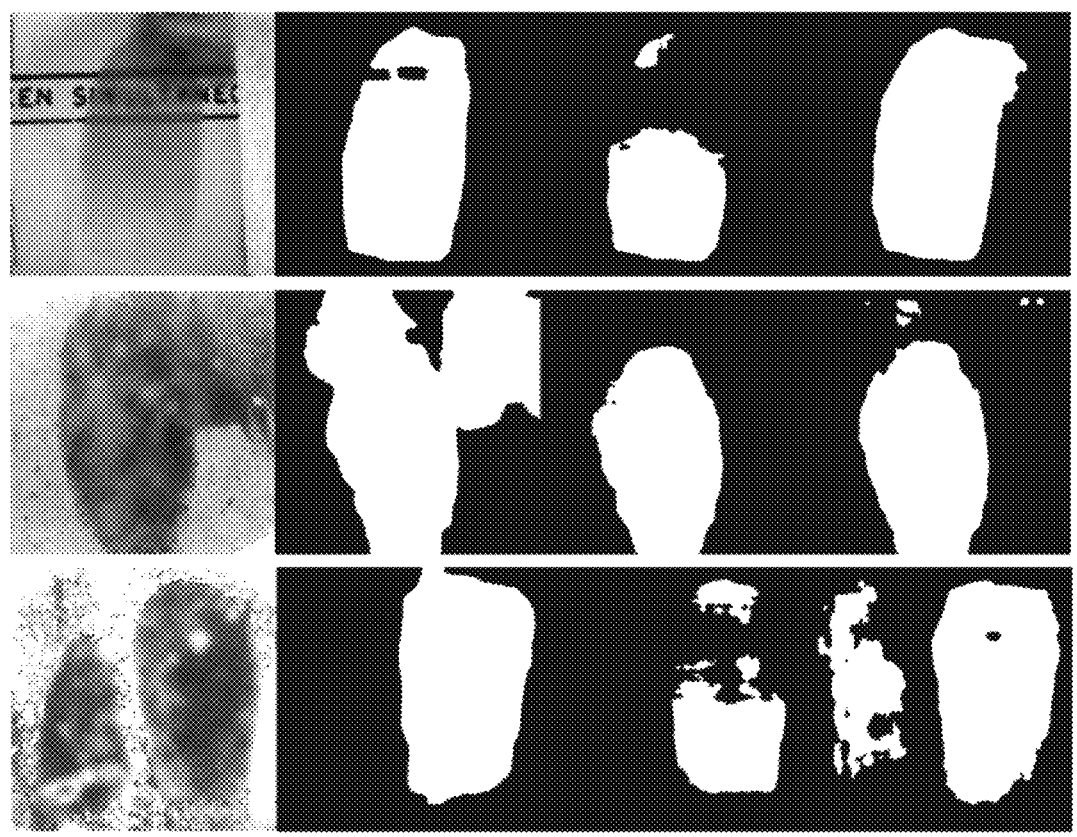

METHOD OF SEGMENTING AN INPUT IMAGE REPRESENTING AT LEAST ONE BIOMETRIC TRAIT BY MEANS OF A CONVOLUTIONAL NEURAL NETWORK

GENERAL TECHNICAL FIELD

The present invention relates to the field of biometrics, and in particular, proposes a method of segmenting an input image representing at least one biometric trait by means of a convolutional neural network, as well as a method of training the convolutional neural networks.

STATE OF THE ART

Biometric authentication/identification consists of recognizing an individual on the basis of biometric traits of that individual such as fingerprints (fingerprint recognition), palm prints, retinal prints, the iris or the face (facial recognition).

Conventional biometric approaches use characteristic information of the biometric trait extracted from the acquired biometry, called features, and the training/classification is done on the basis of the comparison of these characteristics.

In particular, in the case of fingerprint recognition, fingertip images are processed so as to extract the features of a print that can be classified into three categories:

- Level 1 defines the general pattern of that print (one of four classes: right loop, left loop, arch and spiral), and the overall layout of the ridges (in particular, an orientation map called "Ridge Flow Matrix"—RFM map—is obtained, which represents the general direction of the ridge at each point of the print).
- Level 2 defines the particular points of the prints called minutia, which constitute "events" along the ridges (end of a ridge, bifurcation, etc.). The conventional recognition approaches essentially use these features.
- Level 3 defines more complex information such as the shape of the ridges, pores of the skin, scars, etc.

The method of extracting features from a print (in the form of feature maps) is called "encoding," which make it possible to compose a signature called "template" encoding the useful information in the final phase of classification. More specifically, classification will be done by comparing feature maps obtained with one or more reference feature maps associated with known individuals.

While there are now "encoders" available that can efficiently perform this operation of extracting features from prints acquired in a relatively standardized manner (for example by biometric system terminals), there is a difficulty with so-called latent prints, for example those found at a crime scene. Two images of prints of the same identity can have strong rotations relative to each other, occultations as well as a set of distortions. In addition, the background of latent prints is usually very noisy and there is a risk that minutiae may be mistakenly identified in this background.

As a result, the automatic processing of latent prints is now preceded by a task carried out by an expert consisting of manually "encircling" each latent print of interest to isolate it, before providing it to the encoder. This task amounts to a segmentation operation of the latent prints, with the encircled zones being referred to as 'segmentation masks', and as such it would be desirable to implement it automatically.

There are known dedicated convolutional neural networks (CNNs), such as the U-Net network, see RONNEBERGER, Olaf, FISCHER, Philipp, and BROX, Thomas. *U-Net: Convolutional networks for biomedical image segmentation. In: International Conference on Medical image computing and computer-assisted intervention. Springer, Cham*, 2015. pp. 234-241, but in practice it is found that the results on fingerprints do not live up to expectations.

More recently, the CNN FingerNet (see TANG, Yao, GAO, Fei, FENG, Jufu, et al. *Fingernet: An unified deep network for fingerprint minutiae extraction. In:* 2017 *IEEE International Joint Conference on Biometrics (IJCB). IEEE,* 2017. pp. 108-116) enables this segmentation task, among others, but proves to be far too cumbersome and complex for practical use.

It would therefore be desirable to have a more efficient and less cumbersome solution for the segmentation of biometric trait images, in particular latent fingerprints, in order to extract their features.

BRIEF DESCRIPTION OF THE INVENTION

According to a first aspect, the present invention relates to a method of segmenting an input image representing at least one biometric trait, by means of a convolutional neural network, CNN, the method being characterized in that it comprises the implementation, by data processing means of a client, of steps of:

(b) generating, by means of a first subnetwork of said CNN, referred to as a specialization block, a confidence mask associated with a ridge orientation map of the at least one biometric trait represented by said input image, referred to as a RFM mask; said RFM mask being applied to at least the input image so as to obtain a focused input image;

(c) segmenting, by means of a second subnetwork of said CNN, referred to as a segmentation block, the focused input image.

According to advantageous and non-limitative characteristics:

The method comprises a step (a) of extraction, by means of a third subnetwork of said CNN, referred to as a pre-processing block, of at least one feature map of the input image; the input image being concatenated with each extracted feature map so as to obtain a multi-channel input blob; said RFM mask being applied to each channel of the input blob so as to obtain a focused input blob; the specialization block taking the input blob as input and the segmentation block taking the focused input blob as input.

Said pre-processing block is a fully convolutional neural network.

A first segmentation mask is obtained as the output of said segmentation block, the first segmentation mask being concatenated with the RFM mask so as to obtain a two-channel output blob; step (c) comprising the generation, by means of a fourth subnetwork of said CNN, referred to as a post-processing block, of a second confidence mask from said output blob.

Said post-processing block is a so-called decompression block, wherein the number of filters decreases by a constant step from one convolution layer to the next.

The segmentation block is a convolutional neural network selected from among U-Net, DeepLab, mask RNN, YOLO and Inception.

The application of said RFM mask to at least the input image comprises term-to-term matrix multiplication.

The specialization block further generates said ridge orientation map of the at least one biometric trait represented by said input image, referred to as a RFM map.

The method comprises a prior step (a0) of training, by data processing means of a server, from a database of biometric traits images that have already been segmented and for which the RFM mask is available, of parameters of said CNN.

The method comprises a processing step (d) of said segmented input image so as to extract said desired features from each biometric trait represented by said input image.

Said biometric traits are fingerprints, the desired features to be extracted from at least one fingerprint represented by said input image comprising the position and/or orientation of minutiae.

The at least one biometric trait represented by the input image is that of an individual, the method further comprising a step (e) of identifying or authenticating said individual by comparing the desired features extracted from the biometric trait represented by said input image with the features of reference biometric traits.

According to a second and third aspect, a computer program product is proposed comprising code instructions for the execution of a method according to the first aspect of segmentation of an input image representing at least one biometric trait; and a storage means readable by computer equipment on which a computer program product comprises code instructions for executing a method according to the first aspect of segmenting an input image representing at least one biometric trait

DESCRIPTION OF THE FIGURES

Other characteristics and advantages of the present invention will appear upon reading the following description of a preferred embodiment. This description will be given with reference to the attached drawings in which:

FIG. 1 is a schematic diagram of an architecture for the implementation of the method according to the invention;

FIG. 2a represents a first example of a convolutional neural network for the implementation of the method according to the invention;

FIG. 2b represents a second example of a convolutional neural network for the implementation of the method according to the invention;

FIG. 3 represents the steps of a preferred embodiment of the method according to the invention;

FIG. 4 compares examples of segmentation masks obtained with the state of the art, and embodiments of the method according to the invention.

DETAILED DESCRIPTION

Architecture

According to two additional aspects of the invention, the following is proposed:
A method of segmenting an input image representative of at least one biometric trait by means of a convolutional neural network, CNN, and if appropriate extracting desired features from the at least one biometric trait represented by the input image;
A method of training parameters of said CNN.

The input or training data are image-based, and are representative of at least one biometric trait (in other words these are images of the at least one biometric trait, i.e. on which the biometric trait is visible), advantageously selected from a fingerprint, a palm print, a retinal print, etc., and generally any print that can be represented by an image and uniquely associated with an individual. Preferably, said biometric trait is a fingerprint and this example will be taken in the remainder of the description (as will be seen, the present method is particularly effective especially in the case of latent fingerprints).

Segmentation typically consists of the generation of a "segmentation mask" (or segmentation map) of the input image, i.e. a binary image that locates, in the input image, the zones of the input image that contain a biometric trait (examples are provided below, in particular FIG. 4). Specifically, pixels in the input image having a corresponding "white" pixel in the segmentation mask are considered to be pixels of a biometric trait (and therefore of interest), and pixels in the input image having a corresponding "black" pixel in the segmentation mask are considered background pixels (and therefore of no interest).

It is assumed that a related set of white pixels in the segmentation mask constitutes a biometric trait, and several prints can be present on the same input image (in particular in the case of latent fingerprints, where an individual may have placed several fingers next to each other on a surface): the application of the mask on the input image makes it possible to isolate each biometric trait represented therein, in the same way that an expert would manually encircle each print.

The underlying feature extraction typically consists of an "encoding" of an isolated print using the mask, i.e. said desired features to be extracted are typically "biometric" features, i.e. the "final" features that allow the composition of a template of the print as a biometric trait of an individual for the purpose of classification (individual identification/authentication, see below). In this respect, in the case of fingerprints, said desired features typically describe minutiae, i.e. they comprise the position and/or orientation of the minutiae. However, it should be understood that the present method is not limited to this embodiment, and all features that may be of interest in biometrics can be extracted.

The present methods are implemented within an architecture such as shown in FIG. 1, with a server 1 and a client 2. Server 1 is the training device (implementing the training method) and client 2 is a utilization device (implementing the segmentation method and, if appropriate, feature extraction), for example a user terminal.

It is entirely feasible that the two devices 1, 2 are combined, but preferably server 1 is that of a security solution provider, and client 2 is a consumer device, particularly a biometric trait scanner, but also a smartphone, a personal computer, etc. Client device 2 advantageously comprises optical capturing means 23, so that said input image can be directly captured, typically for live processing, alternatively the input image is loaded onto client device 2 (e.g. latent fingerprints can be photographed at a crime scene by a forensic team, and these photos are then loaded onto a dedicated client device 2 back at the forensic facility).

In any case, each device 1, 2 is typically a remote computer equipment connected to an extended network 10 such as the Internet for the exchange of data. Each comprises data processing means 11, 21 of processor type, and data storage means 12, 22 such as computer memory, for example a flash memory or a hard disc.

Server 1 stores a training database, i.e. a set of biometric trait images for which a segmentation mask (and possibly other information such as RFM maps/masks, see below) is already available, as opposed to the so-called input images that one is actually seeking to process.

Principle

The idea of the present method is to always use a CNN to segment an image representing at least one biometric trait, while integrating directly into the CNN means of enhancing "attention" in the form of additional layers/branches of the CNN. This approach makes it possible to continue utilizing simple and effective known segmentation CNNs such as U-Net, while simplifying their task so as to improve their performance.

The CNN is thus divided into two or even three or four subnetworks constituting "blocks" as shown in FIGS. 2a and 2b:

- First subnetwork (Block 1): a main segmentation block that normally takes an image as input representing at least one biometric trait and optionally one or more feature maps constructed from this image (the assembly being called an input blob, see below) and returns the corresponding segmentation mask as an output, called the first segmentation mask. The first segmentation mask can be the final segmentation result as in the embodiment of FIG. 2a.
- Second subnetwork (Block 2): a specialization block (or RFM block), on a parallel branch of the segmentation block, which also takes the image representing at least one biometric trait as input and optionally one or more feature maps constructed from this image (these are the same inputs as the segmentation block), and returns as output at least one confidence mask associated with a ridge orientation map of the at least one biometric trait represented by said input image, called the RFM mask, and optionally the ridge orientation map itself, called the RFM map (which will not be used in practice).
- Third subnetwork (Block 3): an optional pre-processing block advantageously increasing the amount of information supplied to the first two blocks, which takes the image representing at least one biometric trait as input and returns as output said feature map or maps, with the aim of concatenating them with the initial image in the form of a multi-channel "blob", called the input blob. The term blob means nothing more than the n-channel generalization of an image-type object—the input image alone being also able to be seen as a special case of a single-channel input blob. In the remainder of this description, the input in the specialization block will always be referred to as the input blob for convenience, even if this blob is reduced to the input image only (in the absence of a pre-processing block).
- Fourth subnetwork (Block 4, see FIG. 2b): an optional post-processing block advantageously enhancing the first segmentation mask (as generated by the segmentation block), which takes the segmentation mask concatenated with the RFM mask as input (in the form of a 2-channel blob called output blob) and returns as output a second segmentation mask, as a segmentation result.

The idea is to use the RFM mask as an "attention map" applied to the input blob before segmentation. Specifically, the segmentation block does not take the input image/blob "as is", but a "focused" version by applying the RFM mask.

Indeed, it is understood that the RFM mask is already an approximation of the desired segmentation mask (indeed, it is normal that the confidence in an estimated ridge orientation falls on leaving a print, since in practice there is no longer any ridge), so that one knows that the segmentation block can focus on the zones where said confidence is not zero (since these are the only zones of the image where there is a chance of finding a print).

To apply the RFM mask to the input image/blob, simple masking can be done, i.e. a term-to-term matrix product between the image/channel of the input blob and the RFM mask.

With regard to the optional post-processing, it aims to prevent the segmentation from being "too conservative", i.e. that regions of the input image that do represent a biometric trait fragment are excluded. Post-processing thus advantageously allows information from the RFM mask to be preserved that might have been lost in the segmentation block, i.e. to find a consensus between the first segmentation mask and the RFM mask.

In summary, with reference to FIG. 3, the present method of segmenting an input image representing at least one biometric trait starts with an optional step (a) of extraction, by means of the third subnetwork of said CNN, referred to as the pre-processing block, of at least one feature map of the input image; the input image being concatenated with each extracted feature map so as to obtain a multi-channel input blob. Specifically, if k feature maps are generated, the blob has k+1 channels.

Then, in a step (b), the method comprises the generation, by means of the second subnetwork of said CNN, referred to as the specialization block, of a confidence mask associated with a ridge orientation map of the at least one biometric trait represented by said input image, referred to as the RFM mask; then focusing of the input image: said RFM mask is applied to at least the input image so as to obtain a focused input image (if step (a) has been carried out, said RFM mask is applied to each channel of the input blob so as to obtain a focused input blob, the specialization block taking the input blob as input rather than just the input image).

In a step (c), the method then comprises the segmentation itself, by means of the second subnetwork of said CNN, referred to as the segmentation block, of the focused input image (the segmentation blob taking as input at least the focused input image and preferably the entire focused input blob), so as to obtain a segmented input image. It is understood that a segmentation mask is obtained in practice, the segmented image being the input image to which the segmentation mask has been applied (in the same way as the RFM mask was applied upstream to the input image).

The output of the segmentation block is called the first segmentation mask. Preferably, step (c) comprises, as explained, the generation, by means of the fourth subnetwork of said CNN, referred to as the post-processing block, of a second confidence mask from a two-channel output blob obtained by concatenating the first segmentation mask with the RFM mask.

In optional step (d), said segmented input image (i.e. to which the first or second segmentation mask has been applied as described) is advantageously processed so as to extract desired features from the at least one biometric trait represented by said input image.

More detailed examples of the architecture of the different blocks are shown below.

Pre-Processing Block

The first subnetwork of said CNN, i.e. the pre-processing block, is itself a CNN for the extraction of feature maps. Any network comprising at least one convolution layer, and advantageously only convolution layers and optionally pooling layers can be used for this purpose, in particular a fully convolutional network (FCN), in particular with only a few convolution layers (one, two or three) to remain with a limited memory print.

Specialization Block

The second subnetwork of said CNN, i.e. the specialization block (RFM block), is itself also a CNN for obtaining the RFM mask. It should be noted that a number of CNNs for obtaining an RFM map and the associated confidence mask are well known in the state of the art, in so far as the RFM map is generally a necessary object for certain types of biometric trait processing (identification of general fingerprint patterns for example).

It is noted in this regard that, while it is well known to generate a confidence mask associated with an RFM map, it is always for the purpose of quality control of the RFM map, and never as an attention map as in the context of the present invention.

Here, it will be understood that the RFM map in itself is not sought (only the confidence mask is used), but for convenience a skilled person will be able to utilize any known CNN as a specialization block that makes it possible to obtain the map and its confidence mask, although it is quite possible to utilize a block that would only generate the confidence mask.

For example, it is possible to use a CNN down to the eighth resolution, with, for example, a hyperbolic tangent activation function.

Segmentation Block

The third subnetwork of said CNN, i.e. the segmentation block, is itself also a CNN for obtaining the RFM mask. It is noted that many CNNs that allow segmentation are well known in the state of the art and can be taken as is, for example U-Net and DeepLab, but also mask RNN, YOLO, Inception, etc.

It should be recalled that the present method does not in itself change the way the segmentation is performed in the segmentation block, it only provides a cleverly focused input image by virtue of the RFM mask so as to simplify the task of this segmentation block.

Pre-Processing Block

The fourth subnetwork of said CNN, i.e. the post-processing block, is itself a CNN that enables the two-dimensional information of the output blob to be merged into a 1-dimensional feature map constituting the second segmentation mask. As such, any network can be used that allows this merging, including just a convolution layer with a 1×1 filter size.

Preferably, use may be made, as a post-processing block, of a so-called "decompression" block, as described for example in the application FR 1858004 which contains a plurality of convolution layers (noted $CONV_i^{DEC}$, $i \in [[1;n]]$, $n \geq 2$, meaning at least two successive convolution layers, advantageously three, with DEC meaning "decompression").

Preferably, the number of filters can be reduced by a constant step of one convolution layer $CONV_i^{DEC}$ from one decompression block to the next $CONV_{i+1}^{DEC}$.

The last layer $CONV_n^{DEC}$ of the decompression block also has a 1×1-sized filter and acts as the final "merging" convolution layer presented above, but the gradual reduction of the filter size avoids the loss of information.

In the lower quality zones of the input image, it is noted that the decompaction block enables more extensive spatial information to be taken into account and thus to propose a continuous segmentation. For the same reason, when there is an occlusion zone in the image, the decompaction makes it possible to find a connectivity between the ridges and valleys at the edges of that region without information.

Results:

FIG. 4 compares, for three examples of "complicated" latent fingerprints (occlusions, complex background, poor quality):

On the left, the segmentation mask obtained in the conventional manner (only using a U-net type segmentation block);

In the middle the first corresponding segmentation mask obtained in accordance with the invention with the same U-net type segmentation block (directly at the output of the segmentation block, without post-processing);

On the right the second corresponding segmentation mask (after post-processing).

It is clear that the first segmentation mask is much more reliable than the state-of-the-art segmentation mask (which confuses the print and the background a lot), but it is sometimes too conservative (parts of the print are excluded), so the second segmentation mask is very close to reality.

This method therefore greatly improves the segmentation performance.

Training

Advantageously, the method begins with a step (a0) of training, by the data processing means 11 of server 1, from a database of biometric trait images that have already been segmented (i.e. for which a segmentation mask is available), and for which an RFM mask (and, if appropriate, the corresponding RFM map) is available, parameters of said CNN. It is noted that the parameters of all the blocks can be trained at the same time, or block by block (by freezing those of the other blocks)

This training can be carried out in a conventional way. The training cost function can be composed of an attachment to the conventional data—average quadratic error—and a total variation regularization.

In the conventional way, one can start from a database of good-quality prints and augmentation algorithms can be implemented in order to multiply the size of the training database and artificially produce latent prints (e.g. by deforming good-quality prints, creating occlusions, etc.), to ensure the robustness of the CNN against common acquisition defects.

The trained CNN can be stored if appropriate on data storage means 22 of the client 2 for use in segmentation. It should be noted that the same CNN can be embedded on numerous clients 2, only one training is necessary.

Identification/Authentication

As explained, in a step (d), said segmented image can be processed so as to extract said desired features from the at least one biometric trait represented by said input image, which may in particular comprise the position and/or orientation of minutiae in the case of fingerprints.

As explained, step (c) may comprise applying the segmentation mask obtained (the first or preferably the second) to the input image so as to isolate the represented fingerprint(s) as separate images. Indeed, there can be several biometric traits on a single input image. Step (d) is advantageously implemented for each individual print.

Preferably, the method further comprises a step (e) of identifying or authenticating at least one individual by comparing the desired features extracted from the (or each) biometric trait represented by said input image with the features of reference biometric traits, which may be implemented in any manner known to the skilled person.

For example, client 2 may store the features of the prints of one or more persons entered in a police file as reference prints, so as to be able to identify the person who left a latent print: if the features extracted match those expected from a known individual, the identity of that individual is transmitted to the police force.

Alternatively, client 2 may send the extracted features to a database remote from said reference biometric trait features, for identification of the individual.

Note that steps (d) and/or (e) can be implemented as a classification step of an isolated print, for example via one or more dedicated CNNs, and if necessary comprise processing for the improvement of isolated prints, see in particular the application FR 1860323.

Computer Program Product

According to a second and a third aspect, the invention relates to a computer program product comprising code instructions for executing (in particular on data processing means 11, 21 of server 1 and/or client 2) a method for segmenting an input image representing at least one biometric trait, as well as storage means readable by computer equipment (a memory 12, 22 of server 1 and/or client 2) on which this computer program product is found.

The invention claimed is:

1. A method of segmenting an input image representing at least one biometric trait, using a convolutional neural network, CNN, comprising the steps of: implementing, by a data processor (21) of a client (2), the steps of:
   (b) generating, by a first subnetwork of said CNN, referred to as a specialization block, a confidence mask associated with a ridge orientation map of the at least one biometric trait represented by said input image, referred to as a RFM mask; said RFM mask being applied to at least the input image so as to obtain a focused input image;
   (c) segmenting, by a second subnetwork of said CNN, referred to as a segmentation block, the focused input image.

2. The method according to claim 1, comprising a step (a) of extraction, by a third subnetwork of said CNN, referred to as a pre-processing block, of at least one feature map of the input image; the input image being concatenated with each extracted feature map so as to obtain a multi-channel input blob; said RFM mask being applied to each channel of the input blob so as to obtain a focused input blob; the specialization block taking the input blob as input and the segmentation block taking the focused input blob as input.

3. The method according to claim 2, wherein said pre-processing block is a fully convolutional neural network.

4. The method according to claim 1, wherein a first segmentation mask is obtained as the output of said segmentation block, the first segmentation mask being concatenated with the RFM mask so as to obtain a two-channel output blob; step (c) comprising the generation, by a fourth subnetwork of said CNN, referred to as a post-processing block, of a second confidence mask from said output blob.

5. The method according to claim 4, wherein said post-processing block is a so-called decompression block, wherein the number of filters decreases by a constant step from one convolution layer to the next.

6. The method according to claim 1, wherein the segmentation block is a convolutional neural network selected from among U-Net, DeepLab, mask RNN, YOLO and Inception.

7. The method according to claim 1, wherein the application of said RFM mask to at least the input image comprises term-to-term matrix multiplication.

8. The method according to claim 1, wherein the specialization block further generates said ridge orientation map of the at least one biometric trait represented by said input image, referred to as a RFM map.

9. The method according to claim 1, comprising a prior step (a0) of training, by a data processor (11) of a server (1), from a database of biometric trait images that have already been segmented and for which the RFM mask is available, of parameters of said CNN.

10. The method according to claim 1, comprising a processing step (d) of said segmented input image so as to extract said desired features from each biometric trait represented by said input image.

11. The method according to claim 10, wherein said biometric traits are fingerprints, the desired features to be extracted from the at least one fingerprint represented by said input image comprising the position and/or orientation of minutiae.

12. The method according to claim 10, wherein the at least one biometric trait represented by the input image is that of an individual, the method further comprising a step (e) of identifying or authenticating said individual by comparing the desired features extracted from the biometric trait represented by said input image with the features of reference biometric traits.

13. A non-transitory storage medium readable by computer equipment on which a computer program product comprises code instructions for executing a method according to claim 1 of segmenting an input image representing at least one biometric trait.

* * * * *